(12) United States Patent
Higaki

(10) Patent No.: US 8,427,584 B2
(45) Date of Patent: Apr. 23, 2013

(54) OUTPUT DEVICE

(75) Inventor: Yuki Higaki, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1075 days.

(21) Appl. No.: 12/237,789

(22) Filed: Sep. 25, 2008

(65) Prior Publication Data

US 2009/0086099 A1 Apr. 2, 2009

(30) Foreign Application Priority Data

Sep. 27, 2007 (JP) ................................ 2007-251960

(51) Int. Cl.
*H04N 5/60* (2006.01)
*H04N 3/24* (2006.01)

(52) U.S. Cl.
USPC ........... 348/632; 348/462; 348/552; 348/705; 348/738

(58) Field of Classification Search ................... 348/462, 348/465, 466, 473, 738, 552–559, 705, 632; 381/1, 28, 58, 306, 307
See application file for complete search history.

(56) References Cited

U.S. PATENT DOCUMENTS

| | | | | |
|---|---|---|---|---|
| 5,886,691 A | * | 3/1999 | Furuya et al. ................. | 715/721 |
| 5,990,940 A | * | 11/1999 | Hashimoto et al. ........... | 348/184 |
| 7,468,755 B2 | * | 12/2008 | Ando ............................. | 348/553 |
| 7,596,188 B2 | * | 9/2009 | Gotanda et al. ............... | 375/316 |
| 2005/0008323 A1 | * | 1/2005 | Han ................................ | 386/37 |
| 2005/0259181 A1 | | 11/2005 | Watanabe | |
| 2006/0031895 A1 | * | 2/2006 | Kwon et al. ................... | 725/100 |
| 2007/0056006 A1 | | 3/2007 | Kwon et al. | |
| 2007/0077020 A1 | * | 4/2007 | Takahama ........................ | 386/1 |
| 2007/0233906 A1 | * | 10/2007 | Tatum et al. .................... | 710/26 |

FOREIGN PATENT DOCUMENTS

| | | |
|---|---|---|
| EP | 1 819 146 A1 | 8/2007 |
| JP | 2005-333472 A | 12/2005 |
| JP | 2006-108750 A | 4/2006 |
| JP | 2008-352599 A | 12/2006 |
| JP | 2007-108198 A | 4/2007 |
| WO | WO 2007/027948 A2 | 3/2007 |

OTHER PUBLICATIONS

European Search Report dated Jan. 22, 2009 (four (4) pages).
Chinese Office Action dated Feb. 7, 2012 with English translation (ten (10) pages).

* cited by examiner

*Primary Examiner* — Michael Lee
(74) *Attorney, Agent, or Firm* — Crowell & Moring LLP

(57) ABSTRACT

An output device to output an image and/or a sound based on a signal input from one of a plurality of external devices connected to the output device, the external devices including an HDMI source device to input an HDMI signal to the output device. The output device is configured to instruct an adjustment of sound volume of the sound output from the output device; to adjust the sound volume of the output sound in accordance with an instruction from an instruction section; to judge whether a header of an Audio InfoFrame exists in InfoFrame data in the HDMI signal input from the HDMI source device or not; and to invalidate the instruction from the instruction section during a period from time when the header of the Audio InfoFrame is judged not to exist by the judgment section to time when the header is judged to exist.

5 Claims, 2 Drawing Sheets

OUTPUT DEVICE

BACKGROUND OF THE INVENTION

1. Field of the Invention

The present invention relates to an output device.

2. Description of Related Art

In recent years, a standard called as High-Definition Multimedia Interface (HDMI), which has expanded the Digital Visual Interface (DVI) standard, has been put to practical use (see, for example, Japanese Patent Application Laid-Open Publications Nos. 2007-108198, 2006-108750, and 2005-333472). By the HDMI standard, digital uncompressed image/sound signals can be transmitted, and HDMI signals (image/sound/control signals) can be transmitted through one cable. Consequently, the HDMI standard has advantages that high quality images and sounds do not deteriorate, and that wiring can be simplified.

However, the sound volume of an output device of a television receiver or the like, which can output images and sounds based on HDMI signals, can be operated to be increased or decreased even if no sound signals are included in the input HDMI signals and the output device does not output any sounds. Consequently, the sound volume (especially large sound volume) causing a stress to a user is sometimes set because an operation of increasing or decreasing the sound volume is performed even while no sound signals are input. In this case, if the input of a sound signal is started in the setting as it is, the problem of causing a stress to a user is brought about.

It is an object of the present invention to provide an output device capable of preventing the setting of sound volume causing a stress to a user.

SUMMARY OF THE INVENTION

According to a first aspect of the present invention, an output device to output an image and/or a sound based on a signal input from one of a plurality of external devices connected to the output device, the external devices including a High-Definition Multimedia Interface (HDMI) source device to output an HDMI signal to the output device includes: an instruction section to perform an instruction for adjusting sound volume of the sound to be output from the output device; an adjustment section to adjust the sound volume of the sound to be output in accordance with the instruction from the instruction section; a judgment section to judge whether a header of an Audio InfoFrame exists in InfoFrame data in the HDMI signal input from the HDMI source device or not; and an invalidation section to invalidate the instruction from the instruction section during a period from when the judgment section judges that the header of the Audio InfoFrame does not exist to when the judgment section judges that the header exists.

It is preferable that the output device further includes a selection section to select one of the plurality of external devices, wherein the invalidation section invalidates the instruction from the instruction section during a period from when the judgment section judges that the header of the Audio InfoFrame does not exist to when the judgment section judges that the HDMI source device becomes unselected by the selection section.

It is preferable that the output device further includes an informing section to inform a fact that the instruction has been invalidated when the instruction from the instruction section has been invalidated by the invalidation section.

According to a second aspect of the present invention, an output device to output an image and/or a sound based on a signal input from one of a plurality of external devices connected to the output device, the external devices including a High-Definition Multimedia Interface (HDMI) source device to input an HDMI signal to the output device includes: an instruction section to instruct an adjustment of sound volume of the sound output from the output device; an adjustment section to adjust the sound volume of the output sound in accordance with an instruction from the instruction section; a selection section to select one of the plurality external devices; a judgment section to judge whether a header of an Audio InfoFrame exists in InfoFrame data in the HDMI signal input from the HDMI source device or not; an invalidation section to invalidate the instruction from the instruction section during either of a period from time when the header of the Audio InfoFrame is judged not to exist by the judgment section to time when the header is judged to exist and a period from the time when the header of the Audio InfoFrame is judged not to exist by the judgment section to time when the HDMI source device becomes unselected by the selection section; and an informing section to inform a fact that the instruction has been invalidated when the instruction from the instruction section has been invalidated by the invalidation section.

According to the present invention, an output device to output an image and/or a sound based on a signal input from one of a plurality of external devices connected to the output device, the external devices including a High-Definition Multimedia Interface (HDMI) source device to output an HDMI signal to the output device includes: an instruction section to perform an instruction for adjusting sound volume of the sound to be output from the output device; an adjustment section to adjust the sound volume of the sound to be output in accordance with the instruction from the instruction section; a judgment section to judge whether a header of an Audio InfoFrame exists in InfoFrame data in the HDMI signal input from the HDMI source device or not; and an invalidation section to invalidate the instruction from the instruction section during a period from when the judgment section judges that the header of the Audio InfoFrame does not exist to when the judgment section judges that the header exists.

That is, it is judged whether a sound signal is included in an HDMI signal or not by judging whether the header of an Audio InfoFrame exists in InfoFrame data in the HDMI signal or not. If no sound signals are included in the HDMI signal, then the operation of increasing or decreasing sound volume is invalidated, and consequently it is possible to prevent the setting of sound volume causing a stress to a user.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

In the following, the best mode of an output device according to the present invention will be described in detail with reference to the attached drawings. Incidentally, the scope of the present invention is not limited to the shown example.

<Configuration of Output Device>

Figure 1:
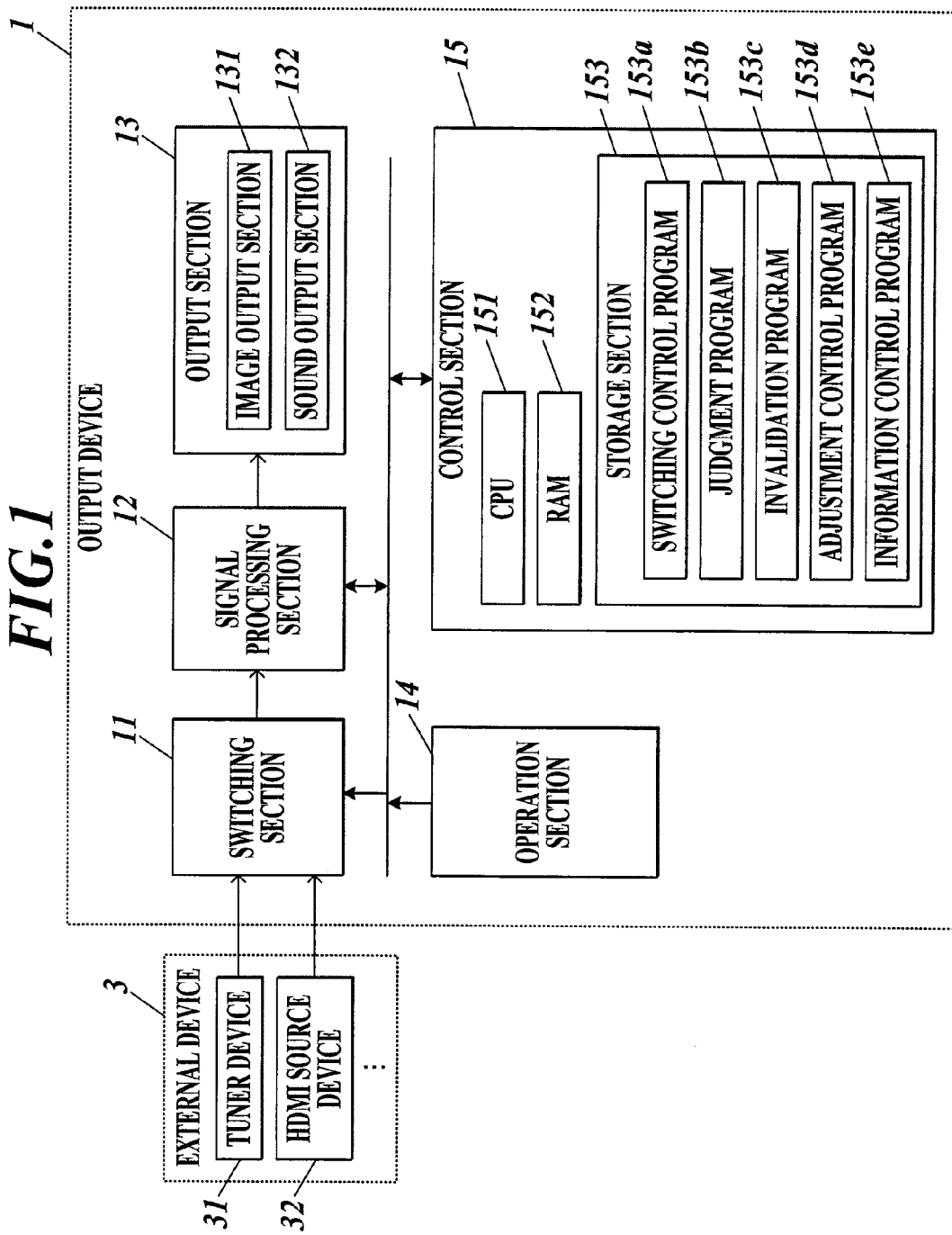
FIG. 1 is a block diagram showing the functional configuration of an output device of the present invention.

An output device 1 is, for example, an image/sound output device incorporated in a liquid crystal television, a plasma television, or the like. For example, as shown in FIG.1, a plurality of external devices 3 is connected to the output device 1, and the output device 1 outputs an image and/or a sound based on a signal input from one of the plurality of external devices 3.

For example, a tuner device 31 receiving a television broadcasting signal to output the received television broadcasting signal into the output device 1 and a High-Definition Multimedia Interface (HDMI) source device 32 outputting an HDMI signal into the output device 1 are connected to the output device 1 as the external devices 3.

The tuner device 31 is incorporated in, for example, a liquid crystal television and a plasma television in each of which the output device 1 is incorporated.

Moreover, the HDMI source device 32 is a reproduction device, such as a digital versatile disc (DVD) player, and is connected to a liquid crystal television, a plasma television, or the like, in which the output device 1 is incorporated, with an HDMI cable.

Incidentally, the plurality of external devices 3 is not limited to the tuner device 31 and the HDMI source device 32, but may include, for example, an audio/video (AV) device connected to the liquid crystal television, the plasma television, or the like, in which the output device 1 is incorporated, with a composite terminal cable, a D terminal cable, or the like, as long as at least the HDMI source device 32 is included.

The output device 1 is composed of, for example, a switching section 11 composed of an AV switch or the like, a signal processing section 12, an output section 13, an operation section 14, a control section 15, and the like, as shown in FIG. 1.

The switching section 11 outputs, for example, a signal input from any of the plurality of external devices 3 to the signal processing section 12.

To put it concretely, the switching section 11 performs the switching of a route of an external input of the output device 1 so that a signal may be input from the external device 3 selected by a user's operation of the operation section 14 among the plurality of external devices 3, for example, in accordance with a control signal input from the control section 15, and outputs the signal input from the route of the switched destination to the signal processing section 12.

The signal processing section 12 performs predetermined processing to, for example, the signal from the external device 3, which signal is input from the switching section 11, in accordance with a control signal input from the control section 15, and separates an image signal, a sound signal, and the like, from the signal. Then, the signal processing section 12 performs predetermined processing such as decoding to the image signal to output the decoded image signal to the image output section 131 of the output section 13, or performs predetermined processing such as decoding to the sound signal to output the decoded sound signal to the sound output section 132 of the output section 13.

To put it concretely, the signal processing section 12, for example, adjusts the sound volume of a sound to be output from the sound output section 132 in accordance with a control signal input from the control section 15.

The output section 13 is composed of, for example, the image output section 131, the sound output section 132, and the like.

The image output section 131 is, for example, a liquid crystal display device and a plasma display device, and outputs (displays), for example, an image based on an image signal input from the signal processing section 12.

The sound output section 132 is, for example, a speaker device, and outputs, for example, a sound based on a sound signal input from the signal processing section 12.

The operation section 14 is composed of, for example, operation buttons provided on the external surface of the output device 1 (the external surface of the liquid crystal television, the plasma television, or the like, in which the output device 1 is incorporated), a remote controller (not shown) for performing the remote control of the output device 1 (the liquid crystal television, the plasma television, or the like, in which the output device 1 is incorporated), and a remote control receiving section capable of communicating with the remote controller. When the operation section 14 is, for example, operated by a user, the operation section 14 outputs various operation signals accompanying the operation to the control section 15.

To put it concretely, the operation section 14 is operated as an instruction section, for example, when a user performs an instruction for adjusting the sound volume of a sound to be output from the sound output section 132 of the output device 1, that is, when a user performs a sound volume adjustment instruction.

Moreover, the operation section 14 is operated as a selection section, for example, when a user selects one of the plurality of external devices 3.

The control section 15 is composed of, for example, a central processing unit (CPU) 151, a random access memory (RAM) 152, and a storage section 153, as shown in FIG. 1.

The CPU 151 performs various control operations in accordance with, for example, various processing programs for the output device 1 stored in the storage section 153.

The RAM 152 includes, for example, a program storing region for expanding a processing program to be executed by the CPU 151, and a data storing region for storing input data, processing results produced at the time of the execution of the processing program, and the like.

The storage section 153 stores, for example, a system program executable in the output device 1, various processing programs executable on the system program, the data to be used at the time of the execution of the various processing programs, and the data of the processing results of the operation processing by the CPU 151. Incidentally, the programs are stored in the storage section 153 in the forms of program codes readable with a computer.

To put it concretely, the storage section 153 stores, for example, a program 153a and a program 153b, as shown in FIG. 1.

The switching control program 153a enables the CPU 151 to realize, for example, the function of inputting a control signal into the switching section 11 to output a signal input from one of the external devices 3 selected with the operation section 14 (user) to the signal processing section 12.

The judgment program 153b enables the CPU 151 to realize, for example, the function of judging whether the header of an Audio InfoFrame exists in the InfoFrame data in an HDMI signal input from the HDMI source device 32 or not.

To put it concretely, the CPU 151 judges whether the header of an Audio InfoFrame exists in InfoFrame data or not on the basis of, for example, an HDMI signal separated by the signal processing section 12.

Here, the HDMI source device 32, for example, outputs an HDMI signal, including an image signal (video data), a sound signal (audio data), an auxiliary signal (auxiliary data), and the like, in conformity with the HDMI standard, into the output device 1. The auxiliary signal includes InfoFrame data (InfoFrame packet). If an HDMI signal includes a sound signal, then the header of an Audio InfoFrame (Audio InfoFrame packet) exists in the InfoFrame data.

The CPU 151 functions as a judgment section by executing the judgment program 153*b*.

An invalidation program 153*c* enables the CPU 151 to realize the function of invalidating any sound volume adjustment instructions from the operation section 14 (user) during a period, for example, from when the CPU 151 that has executed the judgment program 153*b* has judged that no header of the Audio InfoFrame exists to when the CPU 151 judges that a header thereof exists, or from when the CPU 151 that has executed the judgment program 153*b* has judged that no header of the Audio InfoFrame exists to when the HDMI source device is made to become unselected with the operation section 14 (user).

The CPU 151 functions as an invalidation section by executing the invalidation program 153*c*.

An adjustment control program 153*d* enables the CPU 151 to realize the function of making the signal processing section 12 adjust, for example, the sound volume to be output from the sound output section 132 in accordance with a sound volume adjustment instruction from the operation section 14 (user).

Here, an adjustment section is composed of the signal processing section 12, the CPU 151 executing the adjustment control program 153*d*, and the like.

An information control program 153*e* enables the CPU 151 to realize the function of inputting a control signal into the output section 13 to inform the invalidation of sound volume adjustment instructions, for example, when the sound volume adjustment instructions from the operation section 14 (user) have been invalidated by the CPU 151 executing the invalidation program 153*c*.

To put it concretely, the CPU 151 informs the invalidation of the sound volume adjustment instructions by, for example, making the image output section 131 output a predetermined image or a phrase indicating the invalidation of the sound volume adjustment instructions (such as "the adjustment of sound volume is impossible now"), or by making the sound output section 132 output predetermined sounds (such as "the adjustment of sound volume is impossible now").

Here, an informing section is composed of the output section 13, the CPU 151 executing the information control program 153*e*, and the like.

Incidentally, the information of the invalidation of any sound volume adjustment instructions is not limited to perform with the output section 13 (the image output section 131 and the sound output section 132), but the method of information is arbitrary as long as the method can inform a user of the invalidation of any of the sound volume adjustment instructions. For example, a light emitting device may be provided on the screen of the output device 1 (the liquid crystal television, the plasma television, or the like, in which the output device 1 is incorporated) to inform the invalidation of the sound volume adjustment instructions by making the light emitting device emit light. In this case, the informing section is composed of the light emitting device, the CPU 151 executing the information control program 153*e*, and the like.

<Sound Volume Adjusting Processing>

Figure 2:
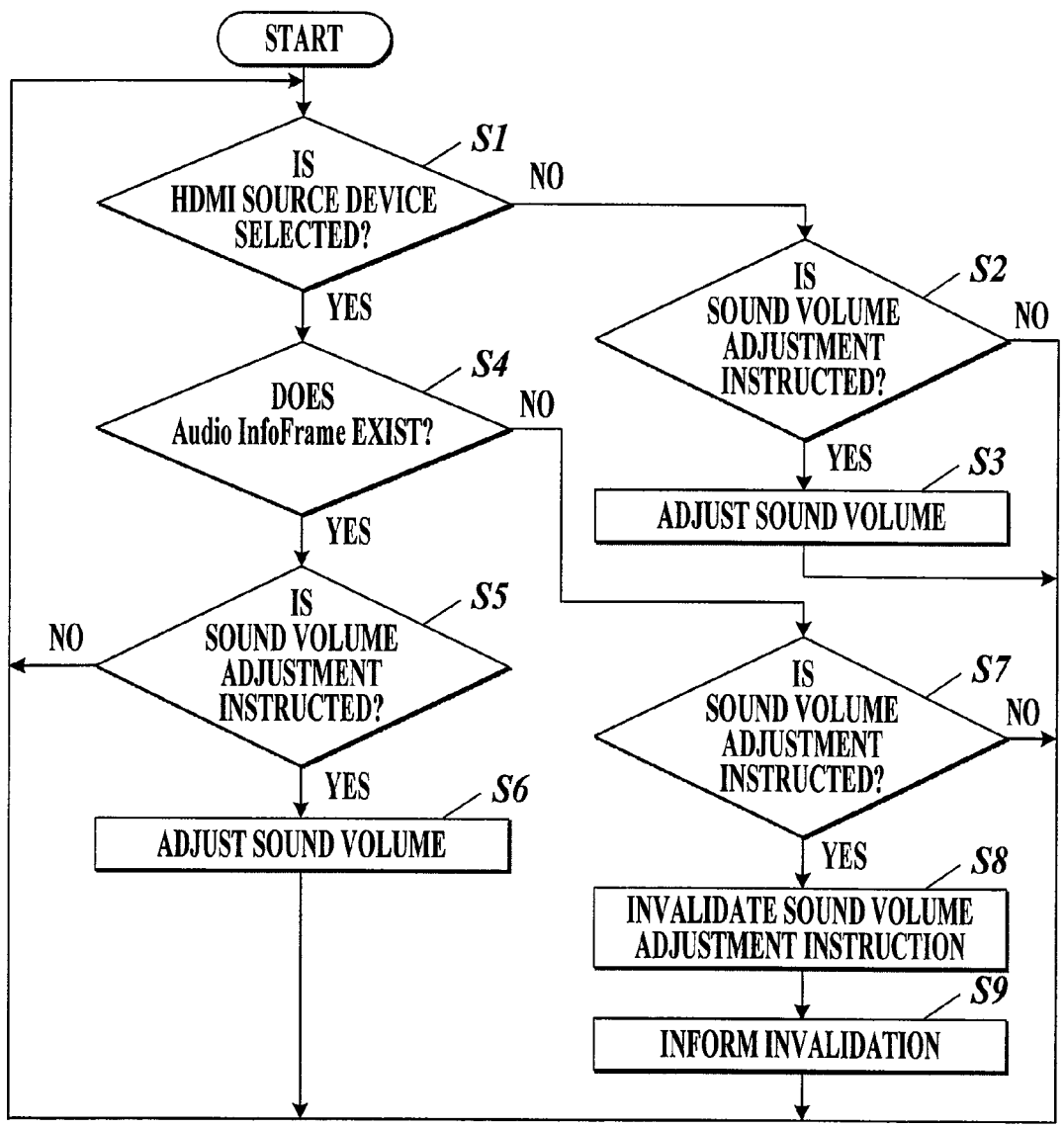
FIG. 2 is a flowchart for illustrating the processing pertaining to the adjustment of sound volume by the output device of the present invention.

The processing pertaining to the adjustment of sound volume by the output device 1 is described with reference to the flowchart of FIG. 2.

First, the CPU 151 judges whether a signal output from the switching section 11 to the signal processing section 12 is the one input from the HDMI source device 32 or not, that is, whether the HDMI source device 32 is selected among the plurality of external devices 3 or not (Step S1).

If the CPU 151 judges that the HDMI source device 32 is not selected at Step S1 (Step S1; No), then the CPU 151 judges whether any sound volume adjustment instruction is generated with the operation section 14 or not (Step S2).

If the CPU 151 judges that no sound volume adjustment instructions are generated at Step S2 (Step S2; No), then the CPU 151 repeatedly performs the processing at and after Step S1.

On the other hand, if the CPU 151 judges that the sound volume adjustment instruction is generated at Step S2 (Step S2; Yes), then the CPU 151 executes the adjustment control program 153*d* to make the sound processing section 12 adjust the sound volume of a sound output from the sound output section 132 in accordance with the sound volume adjustment instruction (Step S3), and repeatedly performs the processing at and after Step S1.

Moreover, if the CPU 151 judges that the HDMI source device 32 is selected at Step S1 (Step S1; Yes), then the CPU 151 executes the judgment program 153*b* to judge whether the header of an Audio InfoFrame exists or not in the InfoFrame data in an HDMI signal input from the HDMI source device 32 (Step S4).

If the CPU 151 judges that the header of the Audio InfoFrame exists at Step S4 (Step S4; Yes), then the CPU 151 judges whether a sound volume adjustment instruction has been generated with the operation section 14 or not (Step S5).

If the CPU 151 judges that no sound volume instructions exist at Step S5 (Step S5; No), then the CPU 151 repeatedly performs the processing at and after Step S1.

On the other hand, if the CPU 151 judges that a sound volume adjustment instruction exists at Step S5 (Step S5; Yes), then the CPU 151 executes the adjustment control program 153*d* to make the signal processing section 12 adjust the sound volume of the sounds output from the sound output section 132 in accordance with the sound volume adjustment instruction (Step S6), and repeatedly performs the processing at and after Step S1.

Moreover, if the CPU 151 judges that the header of the Audio InfoFrame does not exist at Step S4 (Step S4; No), then the CPU 151 judges whether any sound volume adjustment instruction is generated with the operation section 14 or not (Step S7).

If the CPU 151 judges that no sound volume adjustment instruction is generated at Step S7 (Step S7; No), then the CPU 151 repeatedly performs the processing at and after Step S1.

On the other hand, if the CPU 151 judges that any sound volume adjustment instruction exists at Step S7 (Step S7; Yes), then the CPU 151 executes the invalidation program 153*c* to invalidate the sound volume adjustment instruction (Step S8), and executes the information control program 153*e* to inform the invalidation of any sound volume adjustment instructions with the output section 13 (Step S9). Then, the CPU 151 repeatedly performs the processing at and after Step S1.

According to the output device 1 of the present invention described above, the plurality of external devices 3 includes the High-Definition Multimedia Interface (HDMI) source device 32, which outputs an HDMI signal into the output device 1, and is equipped with the operation section 14 to perform an instruction for adjusting the sound volume of a sound to be output from the output device 1, the signal processing section 12 to adjust the sound volume of a sound output from the output device 1 in accordance with the instruction from the operation section 14, the CPU 151 executing the adjustment control program 153b, the CPU 151 executing the judgment program 153b to judge whether the header of an Audio InfoFrame exists or not in the InfoFrame data in an HDMI signal input from the HDMI source device 32, and the CPU 151 executing the invalidation program 153c to invalidate the sound volume adjustment instruction from the operation section 14 during a period from when the CPU 151 judges that the header of the Audio InfoFrame does not exist to when the CPU 151 judges that the header exists.

That is, the CPU 151 judges whether any sound signal is included in an HDMI signal or not by judging whether the header of the Audio InfoFrame exists or not in the InfoFrame data in the HDMI signal. If no sound signals are included in the HDMI signal, then the CPU 151 invalidates the operation of increasing or decreasing the sound volume. Consequently, for example, it can be prevented that sound volume adjustment is performed by the operation of increasing or decreasing the sound volume, which is performed even when no sound signals are input, and which makes a user feel a stress.

Moreover, according to the output device 1, one of the plurality of external devices 3 can be selected with the operation section 14, and any sound volume adjustment instructions from the operation section 14 can be invalidated during a period from when the CPU 151 executing the program 153c judges that no header of an Audio InfoFrame exists to when the HDMI source device 32 becomes unselected with the operation section 14.

Consequently, if the HDMI source device 32 becomes unselected, that is, if the external device 3 other than the HDMI source device 32 is selected, then the header of an Audio InfoFrame does not exist in a signal even if the signal includes a sound signal. According to the output device 1, if the HDMI source device 32 becomes unselected, then a sound volume adjustment instruction from the operation section 14 can be made to be valid regardless of the existence of the header of the Audio InfoFrame.

Moreover, according to the output device 1, the output section 13 and the CPU 151 executing the information control program 153e for informing the invalidation of any sound volume adjustment instructions from the operation section 14 when the sound volume adjustment instructions are made to be invalidated are provided.

Consequently, even if the adjustment of sound volume is instructed, the sound volume is not adjusted during the period in which the sound volume adjustment instructions are made to be invalidated. Since it is possible to inform a user of the invalidation of the sound volume adjustment instructions when the adjustment of the sound volume is instructed, user's sense of unease to the situation in which sound volume is not adjusted even if the adjustment of the sound volume is performed can be eliminated.

Incidentally, the present invention is not limited to the embodiment described above, but may be suitably changed without departing from the spirit and the scope thereof.

The output device 1 may be not incorporated in any of the liquid crystal television or the plasma television as long as the output device 1 can output an image and/or sound based on a signal input from the external device 3.

The entire disclosure of Japanese Patent Application No. 2007-251960 filed on Sep. 27, 2007 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An output device to output an image and/or a sound based on a signal input from one of a plurality of external devices connected to the output device, the external devices including a High-Definition Multimedia Interface (HDMI) source device to output an HDMI signal to the output device, the output device comprising:
   an instruction section to perform an instruction for adjusting sound volume of the sound to be output from the output device;
   an adjustment section to adjust the sound volume of the sound to be output in accordance with the instruction from the instruction section;
   a judgment section to judge whether a header of an Audio InfoFrame exists in InfoFrame data in the HDMI signal input from the HDMI source device or not; and
   an invalidation section to invalidate the instruction from the instruction section so that the previously set sound volume is maintained during a period from when the judgment section judges that the header of the Audio InfoFrame does not exist to when the judgment section judges that the header exists.

2. An output device to output an image and/or a sound based on a signal input from one of a plurality of external devices connected to the output device, the external devices including a High-Definition Multimedia Interface (HDMI) source device to output an HDMI signal to the output device, the output device comprising:
   an instruction section to perform an instruction for adjusting sound volume of the sound to be output from the output device;
   an adjustment section to adjust the sound volume of the sound to be output in accordance with the instruction from the instruction section;
   a judgment section to judge whether a header of an Audio InfoFrame exists in InfoFrame data in the HDMI signal input from the HDMI source device or not;
   a selection section to select one of the plurality of external devices; and
   an invalidation section to invalidate the instruction from the instruction section so that the previously set sound volume is maintained during a period from when the judgment section judges that the header of the Audio InfoFrame does not exist to when the HDMI source device becomes unselected by the selection section.

3. The output device according to claim 1, further comprising an informing section to inform a fact that the instruction has been invalidated when the instruction from the instruction section has been invalidated by the invalidation section.

4. An output device to output an image and/or a sound based on a signal input from one of a plurality of external devices connected to the output device, the external devices including a High-Definition Multimedia Interface (HDMI) source device to output an HDMI signal to the output device, the output device comprising:
   an instruction section to perform an instruction for adjusting sound volume of the sound to be output from the output device;
   an adjustment section to adjust the sound volume of the sound to be output in accordance with the instruction from the instruction section;
   a selection section to select one of the plurality of external devices a judgment section to judge whether a header of an Audio InfoFrame exists in InfoFrame data in the HDMI signal input from the HDMI source device or not;

an invalidation section to invalidate the instruction from the instruction section so that the previously set sound volume is maintained during either of a period from when the judgment section judges that the header of the Audio InfoFrame does not exist to when the judgment section judges that the header exists and a period from when the judgment section judges that the header of the Audio InfoFrame does not exist to when the HDMI source device becomes unselected by the selection section; and an informing section to inform a fact that the instruction has been invalidated when the instruction from the instruction section has been invalidated by the invalidation section.

5. The output device according to claim 2, further comprising an informing section to inform a fact that the instruction has been invalidated when the instruction from the instruction section has been invalidated by the invalidation section.

\* \* \* \* \*